(12) United States Patent
Hayashi

(10) Patent No.: US 10,398,219 B2
(45) Date of Patent: Sep. 3, 2019

(54) METHOD AND APPARATUS FOR MANUFACTURING INDIVIDUAL BRUSH UNIT OF ROTARY TOOTHBRUSH

(71) Applicant: KURUN CO., LTD., Osaka (JP)

(72) Inventor: Isao Hayashi, Osaka (JP)

(73) Assignee: KURUN CO., LTD., Osaka (JP)

( * ) Notice: Subject to any disclaimer, the term of this patent is extended or adjusted under 35 U.S.C. 154(b) by 798 days.

(21) Appl. No.: 14/892,574

(22) PCT Filed: Jul. 8, 2015

(86) PCT No.: PCT/JP2015/069708
§ 371 (c)(1),
(2) Date: Nov. 19, 2015

(87) PCT Pub. No.: WO2017/006473
PCT Pub. Date: Jan. 12, 2017

(65) Prior Publication Data
US 2017/0156481 A1    Jun. 8, 2017

(51) Int. Cl.
*A46D 3/04* (2006.01)
*A46D 3/00* (2006.01)
(Continued)

(52) U.S. Cl.
CPC .............. *A46D 3/045* (2013.01); *A46B 3/06* (2013.01); *A46B 7/08* (2013.01); *A46B 9/04* (2013.01);
(Continued)

(58) Field of Classification Search
CPC ... B29C 65/08; B29C 66/81463; A46D 3/045; A46D 3/06; A46D 1/00; A46D 1/08;
(Continued)

(56) References Cited

U.S. PATENT DOCUMENTS 2,860,921 A * 11/1958 Van Clief, Jr. .......... A46D 3/05
15/181
4,979,256 A    12/1990 Branford
(Continued)

FOREIGN PATENT DOCUMENTS

JP     2003-088424 A    3/2003
JP     2003-219911 A    8/2003
(Continued)

*Primary Examiner* — Mark Spisich
(74) *Attorney, Agent, or Firm* — Rabin & Berdo, P.C.

(57) ABSTRACT

An apparatus for manufacturing an individual brush unit constituting a rotary brush by being stacked in multiple layers, includes an anvil having an insertion hole through which a filament group passes, a filament feeding unit which feeds the filament group from a feeder including a ring cutter on a tip and holds the filament group while a predetermined amount of the filament group protrudes outward from the insertion hole of the anvil, and an ultrasonic welder including a horn having a horn tip portion which pushes and radially expands a protruding tip of the filament group and welds a central part of the expanded filament group, to form the individual brush unit. A core of the welded central part is sandwiched between the ring cutter and the horn tip portion and is cut out, to simultaneously form a shaft hole and separate the individual brush unit from the filament group.

7 Claims, 13 Drawing Sheets

(51) Int. Cl.
*A46D 3/08* (2006.01)
*A46B 3/06* (2006.01)
*B29C 65/08* (2006.01)
*B29C 65/00* (2006.01)
*A46B 9/04* (2006.01)
*A46D 1/04* (2006.01)
*A46B 7/08* (2006.01)
*A46B 13/00* (2006.01)
*A46D 3/06* (2006.01)
*B29L 31/42* (2006.01)

(52) U.S. Cl.
CPC .......... *A46B 13/001* (2013.01); *A46B 13/003* (2013.01); *A46D 1/04* (2013.01); *A46D 3/00* (2013.01); *A46D 3/04* (2013.01); *A46D 3/06* (2013.01); *A46D 3/08* (2013.01); *B29C 65/08* (2013.01); *B29C 66/81463* (2013.01); *B29L 2031/425* (2013.01)

(58) Field of Classification Search
CPC ... A46D 3/00; A46D 3/04; A46D 3/08; A46B 3/06; A46B 13/003; A46B 13/001
USPC .............................................. 300/2, 21, 4, 8
See application file for complete search history.

(56) References Cited

U.S. PATENT DOCUMENTS

| | | | |
|---|---|---|---|
| 7,992,246 B2* | 8/2011 | Takeuchi | A46B 9/026 15/167.1 |
| 2005/0076460 A1* | 4/2005 | Tomiyama | A46B 7/10 15/27 |
| 2007/0277338 A1* | 12/2007 | Takeuchi | A46B 9/026 15/167.1 |
| 2018/0015562 A1* | 1/2018 | Denzer | B23K 9/328 |

FOREIGN PATENT DOCUMENTS

| | | | |
|---|---|---|---|
| JP | 2003-220080 A | | 8/2003 |
| JP | 2003-289947 A | | 10/2003 |
| JP | 2004-097692 A | | 4/2004 |
| JP | 2004097692 | * | 12/2004 |
| JP | 2005-287842 A | | 10/2005 |
| JP | 2008-173427 A | | 7/2008 |
| JP | 2012-016440 A | | 1/2012 |
| JP | 2012016440 | * | 12/2012 |
| JP | 5783435 B1 | | 9/2015 |
| WO | WO-2005/070254 A1 | | 8/2005 |

* cited by examiner

METHOD AND APPARATUS FOR MANUFACTURING INDIVIDUAL BRUSH UNIT OF ROTARY TOOTHBRUSH

TECHNICAL FIELD

The present invention relates to a method and apparatus for manufacturing an individual brush unit that constitutes a rotary brush of a roll toothbrush suitable for removing plaque from teeth and massaging gums.

BACKGROUND ART

A roll toothbrush is a toothbrush manufactured by forming a rotary brush in a roller shape by stacking in multiple layers a substantially disk-shaped individual brush unit including radially bonded filaments made of a synthetic resin such as nylon, and rotatably resting the rotary brush on one end of a handle member of a toothbrush with a support shaft therebetween. Such a roll toothbrush has been commercialized as products for human use and products for use on pets such as dogs. In contrast to a general toothbrush with a bundle of filaments mounted in lines as bristles on one surface of a handle member at one end, this roll toothbrush is characterized by the ability to continuously massage gums with tips of the filaments while removing plaque and, moreover, being less likely to damage gingival, because of free rotating motion of the rotary brush in use.

A proposed method for manufacturing the individual brush unit that constitutes such a rotary brush (hereinafter referred to as "individual brush unit") is, as disclosed in Patent Literatures 1 to 5, radially expanding one tip of a filament group that is a collection of filaments in a bundle, then heating and welding a core of the filament group to form the filament group into a substantial disk shape, and subsequently forming a shaft hole for passing a shaft through at the center of the disk. This method has been in practical use for manufacturing products. The invention disclosed in Patent Literature 4 was invented by the inventor of the present invention.

[Patent Literature 1] Japanese Unexamined Patent Application Publication No. 2003-219911
[Patent Literature 2] Japanese Unexamined Patent Application Publication No. 2003-220080
[Patent Literature 3] Japanese Unexamined Patent Application Publication No. 2003-289947
[Patent Literature 4] Japanese Unexamined Patent Application Publication No. 2004-097692
[Patent Literature 5] Japanese Unexamined Patent Application Publication No. 2005-287842

A common feature of the techniques in these prior art documents is radially expanding on an anvil top surface a filament group protruding from an insertion hole of an anvil, by some expanding means, then welding a core of the expanded filaments by a welder separate from the expanding means, with the expanded filaments secured using a pressing member, and subsequently forming a shaft hole by cutting out the core with the use of cutting means that is also separate from the stated means, to complete an individual brush unit.

The cutting means of the prior art disclosed in Patent Literatures 1, 2, 3, and 5 has a cylindrical blade at a tip and is designed to cut out the core of the individual brush unit and cut off the individual brush unit from the filament group by moving downward into the insertion hole from above the anvil surface. In this regard, the cutting means of the prior art disclosed in Patent Literature 4 is different in that the cutting means has a cylindrical blade at a top end of a cylindrical member that houses and holds the filament group below the anvil, and is designed to cut out the core of the individual brush unit and cut off the individual brush unit from the filament group with the cylindrical blade moving into the insertion hole from below the anvil surface and brought into contact with a bottom surface of a tip of the welder placed further above.

Meanwhile, since welding remains are left on the tip of the filament group after the individual brush unit is cut off, another common feature of the techniques in these prior art documents is including cutting means that cuts off and removes the welding remains from the side. The cutting means of the prior art disclosed in Patent Literatures 1, 2, 3, and 5 is what is called a guillotine cutter embedded in the anvil so as to be horizontally movable, and is configured to cut off the welding remains on the tip of the filament group inside the insertion hole below the anvil top surface. In contrast, the cutting means of the prior art disclosed in Patent Literature 4 is an exposed sliding blade provided so as to be horizontally movable along the anvil top surface, which is different in that the cutting means is configured to cut off the welding remains on the tip of the filament group with the use of the cutting means and an edge surface of the insertion hole of the anvil.

Out of the techniques in these prior art documents, the expanding means of the prior art disclosed in Patent Literatures 1 and 2 for radially expanding one tip of the filament group is a cone having a conical tip which pushes and expands the tip of the filament group. The expanding means of the prior art disclosed in Patent Literatures 3 to 5 is air that is blown into one tip of the filament group so that the tip of the filament group is expanded by air pressure.

It is desirable that the filaments of the individual brush unit be manufactured so as to expand with a uniform density throughout the full circumference. However, the filament group protruding from the insertion hole of the anvil is not always a bundle with a completely uniform density, and even a slight displacement of the center of the expanding means from the center of a cross-section of the tip of the filament group leads to a failure to expand the filaments with a uniform density throughout the full circumference. Therefore, in both cases where the filaments are expanded by being pushed by the cone and where the filaments are expanded by being blown by air, there is a problem that defective products are manufactured due to a variation in the density of filaments, which is inevitably caused as long as the above-described expanding means of the prior art is used.

Furthermore, in the techniques in the prior art documents other than Patent Literature 4, when the cutting means is moved into the insertion hole of the anvil to cut out the core of the individual brush unit and cut off the individual brush unit from the filament group, the tip of the filament group is pushed into the insertion hole, with the result that pressure is applied to the filament group from above, leading to a risk of the filament group being bent or kinked in the insertion hole. Such bending or kinking causes a problem of not only reducing the smoothness of movement of the filament group when the filament group is fed out of the insertion hole so as to protrude on the anvil top surface for manufacturing a next individual brush unit, but also becoming an impediment to the expansion of the filaments on the anvil top surface with a uniform density throughout the full circumference.

Moreover, in the techniques in the prior art documents other than Patent Literature 4, the welder independent of the expanding means is used to weld the filament group, which necessitates horizontally moving the expanding means and the welder on a frame to interchange positions thereof according to a manufacturing process. Therefore, the manufacturing apparatus requires a mechanism that horizontally moves the expanding means and the welder to interchange positions thereof in addition to the mechanisms that feed the filament group, move the pressing member up and down, and move the expanding means and the welder up and down. This not only increases the number of steps and requires standby time for movement of the members, but also cannot help making the structure of the manufacturing apparatus complex. Thus, the manufacturing apparatus has a problem of a high initial cost and low productivity.

DISCLOSURE OF INVENTION

Problems that Invention is to Solve

An object of the present invention is to provide a method and apparatus for manufacturing an individual brush unit at a high level of productivity while producing few defective products, which solves the aforementioned problems of the prior art.

Means to Solve the Problems

In order to achieve the above-stated object, a method for manufacturing an individual brush unit according to the present invention includes the steps of: (i) feeding a filament group from a feeder of a filament feeding unit, and holding the filament group while a predetermined amount of the filament group protrudes outward from an insertion hole of an anvil, the filament group being a collection of multiple filaments in a bundle; (ii) pushing and radially expanding a protruding tip of the filament group by a horn tip portion of an ultrasonic welder; (iii) welding a central part of the expanded filament group by the horn tip portion, to form the individual brush unit; and (iv) sandwiching the welded central part between a ring cutter provided on a tip of the feeder and the horn tip portion, and cutting out a core of the welded central part, to simultaneously form a shaft hole and separate the individual brush unit from the filament group.

The greatest feature of the present invention is using the ultrasonic welder as expanding means in the step (ii) to radially expand the protruding tip of the filament group on an anvil top surface, and welding the central part of the filament group in the step (iii) by the same ultrasonic welder which serves as the expanding means. This means that the ultrasonic welder is used also as the expanding means which is a separate member in the prior art.

Ultrasonic welding is a processing technique to instantly fuse a thermoplastic resin by ultrasonic vibration and welding pressure. Specifically, an alternating-current voltage with frequency amplified by an oscillator is transmitted to a transducer having a piezoelectric element to convert the alternating-current voltage into mechanical vibrational energy, thereby vibrating at high speed a resonator called horn and transferring the mechanical vibrational energy to a welding target to generate frictional heat at a temperature exceeding a melting temperature on an interface between a horn end surface and the welding target so that the welding target is welded.

In the present invention, the horn of the ultrasonic welder has a cylindrical shape, and the filaments are radially expanded by the horn having a circular end surface brought into contact with a cross-section of the protruding tip of the filament group and moving forward in an axial direction of the filament group. In the process in which the horn end surface vibrates to push and expand the filament group, most of the mechanical vibrational energy is diffused by free vibration of each of the filaments, with the result that on the interface to the horn end surface, frictional heat at a temperature exceeding the melting temperature of the filaments is not generated and therefore welding does not occur. Afterward, when the horn end surface is moved forward until it reaches a position a distance equal to a design thickness of the individual brush unit away from the anvil top surface, the filament group is pushed to radially expand on the anvil top surface by the horn end surface, and the central part of the expanded filament group is sandwiched between the horn end surface and the anvil top surface and thereby secured by pressure. At this point, most of the mechanical vibrational energy of the horn end surface is directly transmitted to the interface to the filaments, and accordingly, frictional heat at a temperature exceeding the melting temperature is generated, causing welding of the filament group. The welded filament forms the core of the individual brush unit.

In the process in which the horn end surface pushes and expands the filament group as described above, each of the filaments vibrates freely, and adjacent filaments repeatedly come into contact with each other and repel each other by vibration. Therefore, even when there is a variation in density within the filament group which is being expanded, such a variation is eliminated as the horn end surface moves forward, and at the time the filament group is pushed to expand on the anvil top surface, the filaments are expanded with a nearly uniform density throughout the full circumference. As a result, it is possible to effectively reduce the occurrence of defective products being manufactured due to a variation in the density of filaments of the individual brush unit which is inevitable in the techniques of the prior art that adopt the cone having a conical tip or the air blow as the expanding means.

With this configuration, the horn of the ultrasonic welder is used also as the expanding means, enabling continuous execution of the step (ii) and the step (iii) without interruption, which eliminates the need in the prior art for the mechanism and time for horizontal movement to interchange separate expanding means and welder each time as needed according to the progress of the steps. Thus, the manufacturing apparatus has a simpler structure and improved productivity.

The filament feeding unit includes a chuck that introduces and feeds a bundle of the filament group into the manufacturing apparatus and a feeder having a shaft tube through which the filament group is inserted. The chuck is, for example, formed including a casing and an elastic member in the shape of a tube provided in the casing, and configured to be movable back and forth along an axial direction of the filament group while holding and releasing the filament group inserted therein by stretching and shrinking the elastic member with air flowing in and out of the casing. The feeder has, on one end of the shaft tube facing the anvil, a substantially cylindrical feeding hole having on an end an annular blade, that is, a ring cutter, and is also configured to be movable back and forth along the axial direction of the filament group.

In the step (iv), the feeder is moved up toward the anvil along the axial direction of the filament group so that the end of the feeding hole enters the insertion hole from below the anvil. The end of the feeding hole intrudes into the central part of the individual brush unit formed in the step (iii) and secured on the anvil top surface by the horn end surface, and, furthermore, the ring cutter on the end is brought into contact with the horn end surface so that the welded part is sandwiched therebetween, and cuts off the welded part, to simultaneously form a shaft hole and separate the individual brush unit from the filament group.

With this configuration, the feeder included in the structure of the filament feeding unit is used also as the cutting means, and there is thus no need for the independent cutting means of the prior art other than the invention disclosed in Patent Literature 4. Accordingly, in the step (iv), the mechanism and time for horizontal movement to interchange the welder and the cutting means are not necessary. Thus, the manufacturing apparatus has a simpler structure and improved productivity.

Note that since it is not until completion of the welding in the step (iii) that using the ring cutter and the horn end surface, the shaft hole is formed in the individual brush unit, and the individual brush unit is separated from the filament group simultaneously, the welded part has already been cooled down and become solid, meaning that there is no risk of a melted material of the filaments being attached to the ring cutter that has intruded into the welded part.

The invention relates to an apparatus for manufacturing an individual brush unit which can implement the method for manufacturing an individual brush unit of a rotary brush and includes: an anvil having an insertion hole through which a filament group passes, the filament group being a collection of multiple filaments in a bundle; a filament feeding unit which feeds the filament group from a feeder including a ring cutter on a tip, and holds the filament group while a predetermined amount of the filament group protrudes outward from the insertion hole of the anvil; and an ultrasonic welder including a horn having a horn tip portion which pushes and radially expands a protruding tip of the filament group and welds a central part of the expanded filament group, to form the individual brush unit, wherein a core of the welded central part is sandwiched between the ring cutter and the horn tip portion and is cut out, to simultaneously form a shaft hole and separate the individual brush unit from the filament group.

Next, the invention relates to the apparatus for manufacturing an individual brush unit, which further includes a sliding blade which is provided on a top surface of the anvil and cuts off and removes welding remains of the filament group cut using the ring cutter and the horn tip portion.

As described above, in the prior art other than the invention disclosed in Patent Literature 4, the cutting means is embedded in the anvil so as to be horizontally movable, and cuts off the welding remains on the tip of the filament group in the insertion hole below the anvil top surface. With this configuration, if a melted material of the filaments is attached to, and thus remains on, the inner surface of the insertion hole between the cross-section of the cut filament group and the anvil top surface, the filament group which is passing through the insertion hole is impeded from being smoothly fed due to resistance, creating a risk that the filament group protruding from the insertion hole for manufacturing a next individual brush unit is not evenly expanded. In contrast, according to a configuration of the present invention, the ring cutter is provided on the anvil top surface, and the filament group is cut on the anvil top surface, meaning that there is no risk of a material being attached to the inner surface of the insertion hole, and the movement of the filament group is not impeded.

Lastly, the invention relates to the apparatus for manufacturing an individual brush unit, which further includes an air blower for removing, from the anvil, the individual brush unit separated from the filament group, by air pressure.

When the welding remains are cut off and removed from the tip of the filament group with the use of the cutting means, the ring cutter enters between the individual brush unit already separated from the filament group and the anvil top surface, resulting in the individual brush unit leaping from the insertion hole by the ring cutter, but still remaining on the anvil top surface. In the present invention, air is ejected from the air blower onto the anvil top surface so that the finished individual brush unit on the anvil can be blown away and removed from the anvil by air pressure, and collected, for example, in a separate basket for collection.

The apparatus for manufacturing an individual brush unit proposed in Patent Literatures 1 to 3 subsequently inserts a pipe shaft into the shaft hole of the finished individual brush unit, lifts up the individual brush unit from the anvil, and performs the step of stacking a predetermined number of subsequently manufactured individual brush units on the pipe shaft. In this configuration, the entire process to obtain a finished product of the rotary brush in a roller shape is automated. However, this configuration necessitates a mechanism for holding the pipe shaft and repetitively inserting the pipe shaft into the shaft hole of an individual brush unit, such as a pipe gripper, which not only makes the manufacturing apparatus more complex, but also reduces the productivity when focusing only on the manufacture of an individual brush unit.

Therefore, it is based on the premise that the manufacturing apparatus according to the present invention only handles the manufacture of an individual brush unit, and manual labor is used to perform an assembling step of stacking a predetermined number of manufactured individual brush units, inserting the pipe shaft into this stack of individual brush units to produce a rotary brush, and then fitting the rotary brush with a handle to obtain a finished toothbrush. Note that this is not intended to exclude a manufacturing apparatus capable of performing the assembling step as well; a configuration for performing the assembling step is freely added to the apparatus for manufacturing an individual brush unit according to the present invention.

Effects of the Invention

According to a configuration of the present invention, it is possible to solve the problem that when the filament group is radially expanded on the anvil top surface, there is a variation in density of the filaments, which is inevitable in the prior art, thereby producing the effect of reducing the rate of occurrence of defective products in the manufacture of an individual brush unit of a rotary toothbrush. Furthermore, since an individual brush unit can be manufactured by a simpler manufacturing method and apparatus than that of the prior art, the advantageous effects of reducing the initial cost for the manufacturing apparatus and improving the productivity of the manufacturing apparatus are produced.

BEST MODE FOR CARRYING OUT THE INVENTION

One embodiment of the present invention is described below based on the drawings. FIG. 1 is a cross-sectional view illustrating a configuration of a main part of an apparatus for manufacturing an individual brush unit according to an embodiment of the present invention, and FIG. 2 is a perspective view illustrating this configuration.

The main part of the manufacturing apparatus includes an anvil unit 2, a filament feeding unit 3 including a chuck 4 and a feeder 5, an ultrasonic welder 6, a pressing member 7, and a sliding blade 8, and manufactures an individual brush unit S from a filament group 1. The anvil unit 2 has a frame 20 and an anvil 21 secured to the frame 20 with a bolt B. The anvil 21 has an insertion hole 22 at the center and has on a lower surface a hollow space 23 in which an upper part of the feeder 5 is housed in such a way that the feeder 5 is movable back and forth. In FIG. 2, the frame 20 is omitted. The chuck 4 includes a casing 40 in the shape of a cylinder and an elastic member 41 in the shape of a tube provided in the casing 40, and can hold and release the filament group 1 with the elastic member 41 by a compressor 43 causing air to flow in and out through a supply and exhaust hole 42. The feeder 5 is a cylindrical member having a shaft tube 50 through which the filament group 1 penetrates, and has on the top end of the shaft tube 50 a feeding hole 51 in the shape of a cylinder with a ring cutter 51a on an edge when viewed in cross section. The chuck 4 and the feeder 5 are independently movable up and down along the axis of the filament group 1 by an actuating mechanism not shown in the drawings. The diameter of the feeding hole 51 corresponds to the inner diameter of the insertion hole 22. When the feeder 5 moves back and forth in the hollow space 23, the feeding hole 51 also moves back and forth in the insertion hole 22. A lower part of the ultrasonic welder 6 forms a horn 60. The horn 60 vibrates at high speed with an alternating-current voltage supplied from an oscillator 61. The ultrasonic welder 6 is also movable up and down along the axis of the filament group 1 by an actuating mechanism not shown in the drawings, and a horn end surface 60a which is the bottom end of the horn 60 can be lowered close to an anvil top surface 21a. The pressing member 7 is not an essential constituent in the present invention as described later, but in the present example, has a through hole 70 at the center through which the horn 60 can be inserted, and is movable up and down along the axis of the filament group 1 by an actuating mechanism not shown in the drawings, and has a pressing member bottom surface 7a that can be lowered close to the anvil top surface 21a. The sliding blade 8 is horizontally movable along the anvil top surface 21a by an actuating mechanism not shown in the drawings, and can cut off the filament group 1 by sliding the tip of the sliding blade 8 to above the insertion hole 22.

A thermoplastic resin, especially nylon, is a good material for filaments included in the filament group 1. The thickness of the filaments which correspond to bristles of a typical toothbrush and the number of filaments included in the filament group 1 are arbitrary. In the present example, 1,120 filaments each having a diameter of 0.076 mm are bundled together to form the filament group 1 having a diameter of 3.4 mm, and each of the insertion hole 22, the shaft tube 50, and the feeding hole 51 has such an inner diameter that the filament group 1 can freely move back and forward with this diameter maintained. As to the materials of the main members stated above, it is preferred that the elastic member 41 be made of rubber and at least the horn 60 of the ultrasonic welder 6 have the horn end surface 60a that is made of chrome-plated titanium, but steel can be used for the other main members.

The ultrasonic welder 6 is configured to also serve as the expanding means, and does not eject air unlike the expanding means of the prior art, eliminating the need to provide an air jet nozzle or an air tube, but may be configured with a jet nozzle and an air tube for cooling a welded portion by air according to the need.

Note that according to the study by the inventor over the years, the limit of the applicable thickness of the filaments in the prior art is 0.2 mm in diameter, and it has been observed that a trouble occurs if filaments having a diameter less than the limit are applied. This is because, in a configuration of the prior art in which the cutting means having a cylindrical blade at a tip cuts out the core of the individual brush unit and cuts off the individual brush unit from the filament group by moving downward into the insertion hole from above the anvil surface as described above, the tip of the filament group is pushed into the insertion hole, with the result that pressure is applied to the filament group from above, leading to a risk of the filament group being bent or kinked in the insertion hole. Another reason is that in the prior art in which the cone or air is used as the expanding means to push or blow and expand the filaments, there is a risk that filaments thinner than the limit are not uniformly expanded throughout the full circumference, causing a variation in the density of expanded filaments.

However, if the thickness of filaments is set to approximately 0.2 mm, the use of a toothbrush that includes such filaments may damage a user's gum or the inside of a user's mouth because such filaments after the cut are sharp in cross-section. Therefore, in the prior art other than the invention disclosed in Patent Literature 4, the manufacturing apparatus is forced to additionally include a finisher that performs finishing work on the filaments so that the tip of filaments has a round cross-section. In this regard, in the present embodiment, far thinner filaments can be used, and therefore such finishing work is not necessary, allowing the manufacturing apparatus to be simpler in structure and advantageous in productivity as compared to that in the prior art.

Next, FIG. 3 to FIG. 13 illustrate a process for manufacturing an individual brush unit in the present embodiment The process is described step by step below with reference to the drawings.

FIG. 3 and FIG. 4 illustrate the step (i) in which the filament group 1 is fed from the feeder 5 of the filament feeding unit 3 and held while a predetermined amount thereof protrudes outward from the insertion hole 22 of the anvil 21. In FIG. 3, the feeder 5 stays in the hollow space 23 of the anvil 21 with the end of the feeding hole 51 positioned lower than the anvil top surface 21a by L1. This L1 is a distance provided in order to prevent the end of the feeding hole 51 from interfering with the sliding blade 8 when the sliding blade 8 cuts off welding remains N from the tip of the filament group 1 after the previous individual brush unit S is separated. The chuck 4 is located below the feeder 5, and introduces air A into the casing 40 to inflate the elastic member 41, thereby holding the filament group 1. In FIG. 4, the filament group 1 is held while a length L2 thereof at the tip is fed out of the feeding hole 51 and protrudes from the insertion hole 22 as a result of the filament group 1 being raised inside the feeder 5 by the chuck 4 moving upward.

FIG. 5 and FIG. 6 illustrate the step (ii) in which the protruding tip of the filament group 1 is pushed to radially expand by the horn 60 of the ultrasonic welder 6. When the activated ultrasonic welder 6 moves down, the protruding tip of the filament group 1 is pushed to radially expand by the horn 60. At this time, each of the filaments vibrates freely by vibration of the horn 60, and adjacent filaments repeatedly come into contact with each other and repel each other by the vibration. Therefore, a variation in density within the filament group being expanded is eliminated as the horn end surface moves forward, and at the time the filament group is pushed to expand on the anvil top surface as illustrated in FIG. 6, the filaments are expanded with a nearly uniform density throughout the full circumference. Note that L3 in FIG. 6 indicates the thickness of the filaments completely expanded on the anvil top surface 21a. The value of L3 is determined according to a desired thickness of an individual brush unit. When L3 is too small, there is a risk that the welding progresses more than needed, resulting in filaments outside a core M of the individual brush unit S being welded together. On the other hand, when L3 is too large, the welding is insufficient, with the result that the filaments of the finished individual brush unit S easily fall out. According to the study by the inventor, it is favorable to set L3 to a value in the range from 0.25 mm to 0.30 mm when 1,120 filaments each having a thickness of 0.076 mm are bundled together to form the filament group 1 having a thickness of 3.4 mm as described above, for example.

FIG. 7 illustrates the step (iii) in which the central part of the expanded filament group 1 is welded by the horn end surface 60a. The central part of the expanded filament group 1 is sandwiched between the horn end surface 60a and the anvil top surface 21a and thereby secured by pressure. At this point, most of the mechanical vibrational energy of the horn end surface 60a is directly transmitted to the interface to the filaments, thus generating frictional heat at a temperature exceeding the melting temperature, which results in the filament group 1 being welded to form the core M of the individual brush unit S.

Note that FIG. 7 illustrates a configuration in which the filament group 1 except the core M of the individual brush unit S is pressed against, and secured to, the anvil top surface 21a by the pressing member 7 moving downward. In the present invention, the ultrasonic welder 6 is used also as the expanding means as described above, meaning that the filament group 1 radially expanded in the step (ii) is, as it is, immediately welded by the horn end surface 60a, which is the step (iii). Therefore, unlike in the prior art, there is no need to prevent the filament group 1 from returning back to the original shape after the expanding means moves up before the welder moves down, and thus the pressing member 7 is not an essential constituent in the present invention. In practice, it has been observed that even without the pressing member 7, the manufacturing apparatus produced by the inventor is capable of manufacturing an individual brush unit without trouble. However, depending on the material and thickness of the filaments, heat generated during the welding is transferred to each of the expanded filaments, and troubles may occur such as a part of the filaments being curved up when viewed in the drawings or a variation being caused in the density of a part of the filaments. Therefore, in order to avoid such troubles in the welding process, a configuration of the present embodiment includes the pressing member 7 for allowing the expanded filament group 1 to be pressed against, and secured to, the anvil top surface 21a.

FIG. 8 to FIG. 13 illustrate the step (iv) of forming the shaft hole by cutting out the core of the welded central part. After the core M of the individual brush unit S is formed in the step (iii), the feeder 5 is moved upward until the end of the feeding hole 51 intrudes into the core M as in FIG. 8. This allows the ring cutter 51a provided on the end of the feeding hole 51 to come into contact with the horn end surface 60a and cut off the core M to simultaneously form a shaft hole and separate the individual brush unit S from the filament group. Note that since it is not until completion of the welding in the step (iii) that the individual brush unit S is separated from the filament group at the same time when the shaft hole is formed in the individual brush unit S, the core M has already been cooled down and become solid, meaning that there is no risk of a melted material of the filaments being attached to the intruded ring cutter.

Subsequently, in FIG. 9, the individual brush unit S is separated from the filament group 1 as a result of the ultrasonic welder 6 and the pressing member 7 moving up and the feeder 5 also moving up slightly. At this time, the tip of the filament group 1 is melting remains which are filaments melted and then solidified. Afterward, as illustrated in FIG. 10, the filament group 1 is released when the elastic member 41 is shrunk as a result of the air A flowing out of the casing 40 of the chuck 4. Furthermore, as illustrated in FIG. 11, the feeder 5 is moved down the initial length of L1, and the chuck 4 is also moved down. At this time, there is no change in the position of the filament group 1 because the filament group 1 is released from the chuck 4.

In FIG. 12, the melting remains on the tip of the filament group 1 are cut off with the sliding blade 8 horizontally moving along the anvil top surface 21a. At this time, the individual brush unit S leaps up because of the thickness of the sliding blade 8, but remains on the anvil 21. Lastly, in FIG. 13, air A is ejected onto the anvil top surface 21a from an air blower not 100 so that together with the welding remains N that have been cut off, the individual brush unit S is removed from the anvil 21 and collected by being dropped, for example, into a basket for collection not shown in the drawings. Through the foregoing process, a series of steps for manufacturing the individual brush unit S is completed.

Although a specific configuration of the method and apparatus for manufacturing an individual brush unit of a rotary toothbrush according to the present invention has been described above, the present invention is not limited to the above embodiment. Improvement or modifications can be made within the scope of the technical idea of the present invention, and those improved or modified embodiments are considered to fall within the technical scope of the present invention.

INDUSTRIAL APPLICABILITY

The present invention is applicable to the manufacture of a plurality of disk-shaped individual brush units included in a rotary brush, in manufacture of a toothbrush for human use or for use on pets such as dogs. As compared to the prior art, the apparatus for manufacturing an individual brush unit is simpler with improved productivity and therefore useful for reducing the initial cost and the production cost.

Furthermore, according to a configuration of the present invention, it is possible to enlarge the diameter of an individual brush unit to be manufactured, and therefore manufacture a larger rotary brush as well, by enlarging the outer diameter of the horn end surface of the ultrasonic welder and increasing the length of the filament group that protrudes from the insertion hole of the anvil. Thus, the present invention is applicable not only to the manufacture of a toothbrush, but also to the manufacture of a cosmetic or medical roll brush and an industrial brush usable for cleaning the inside of various pipes and for other industrial purpose.

NUMERICAL REFERENCES

Figure 1:
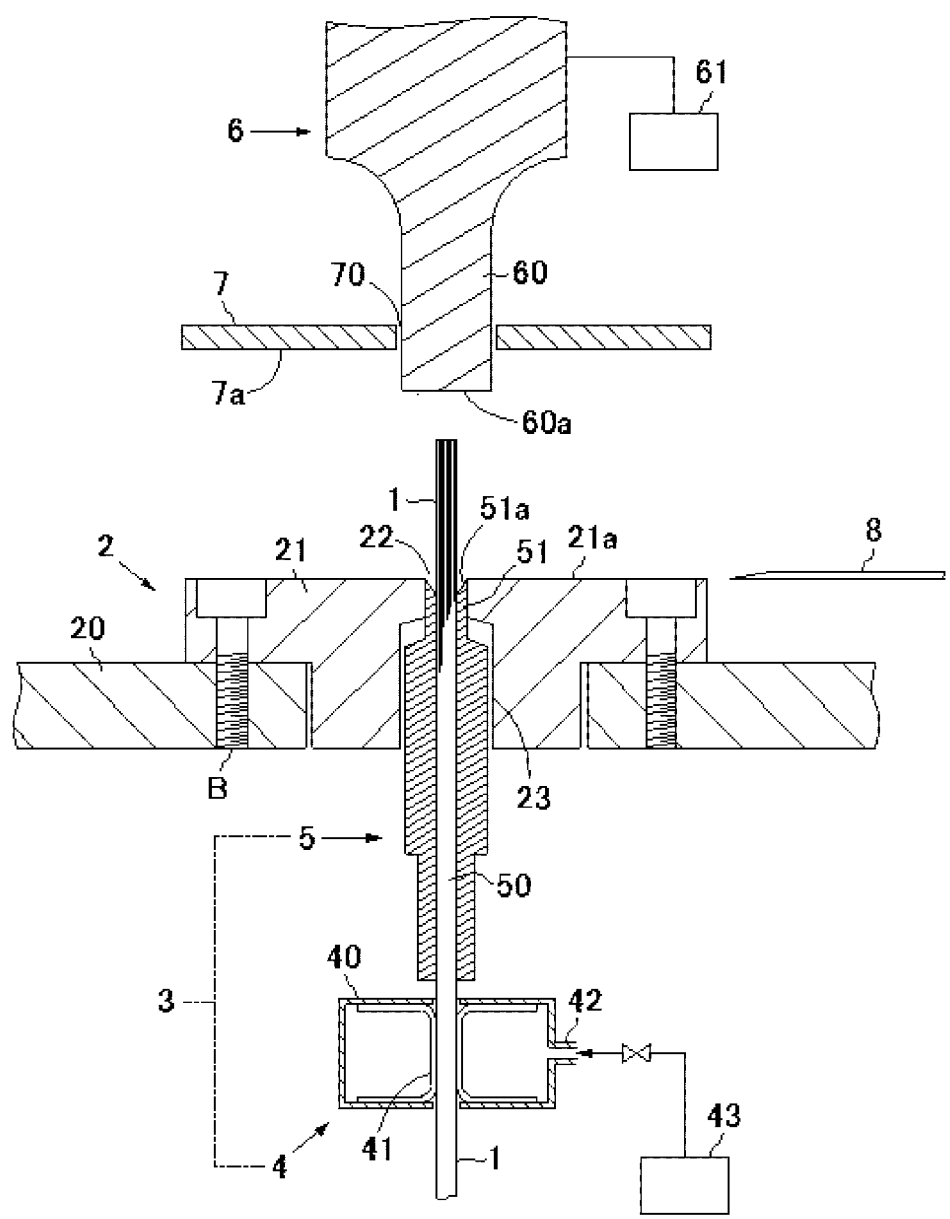
FIG. 1 is a cross-sectional view illustrating a configuration of a main part of an apparatus for manufacturing an individual brush unit according to an embodiment.
Figure 2:
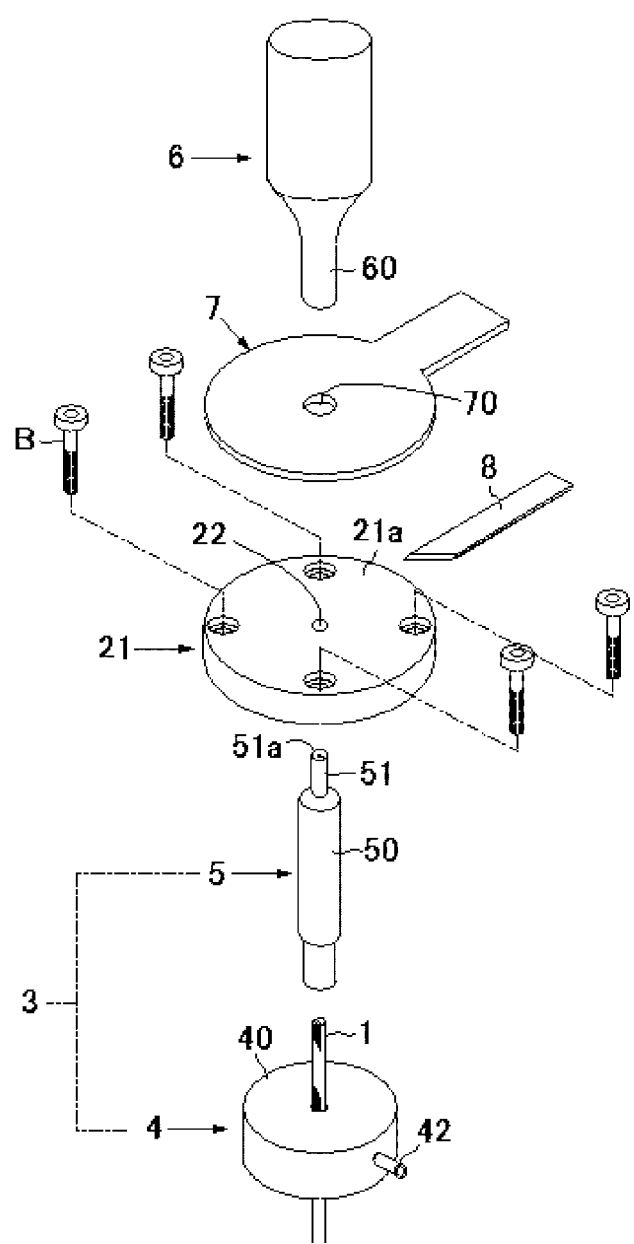
FIG. 2 is a perspective view illustrating a configuration of a main part of an apparatus for manufacturing an individual brush unit according to an embodiment.
Figure 3:
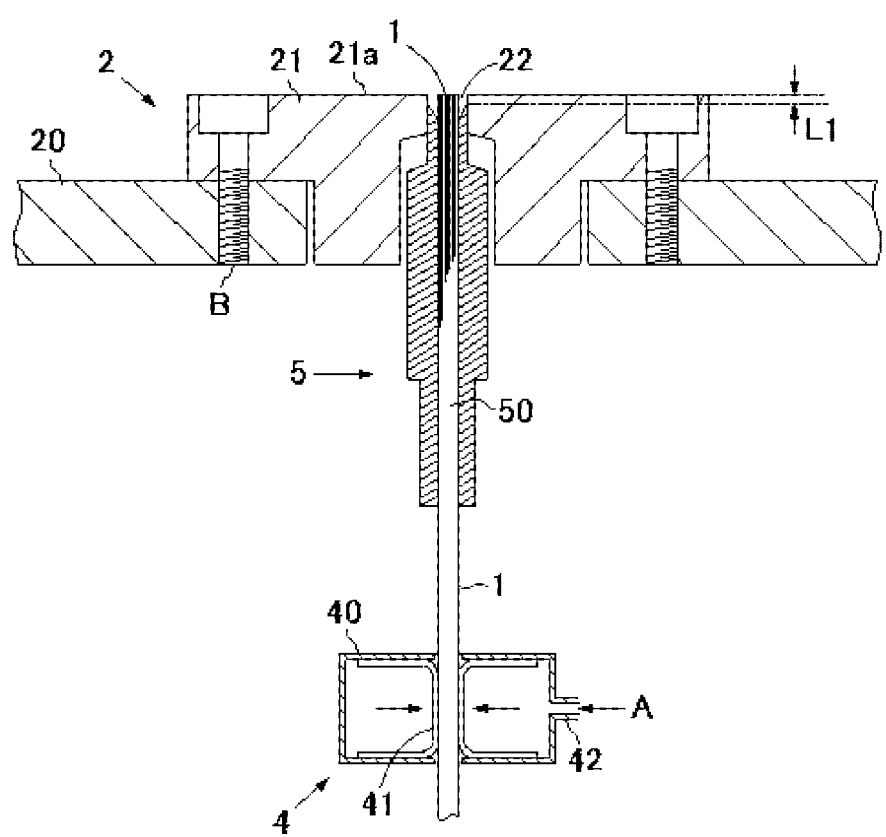
FIG. 3 is a cross-sectional view illustrating a part of the step (i).
Figure 4:
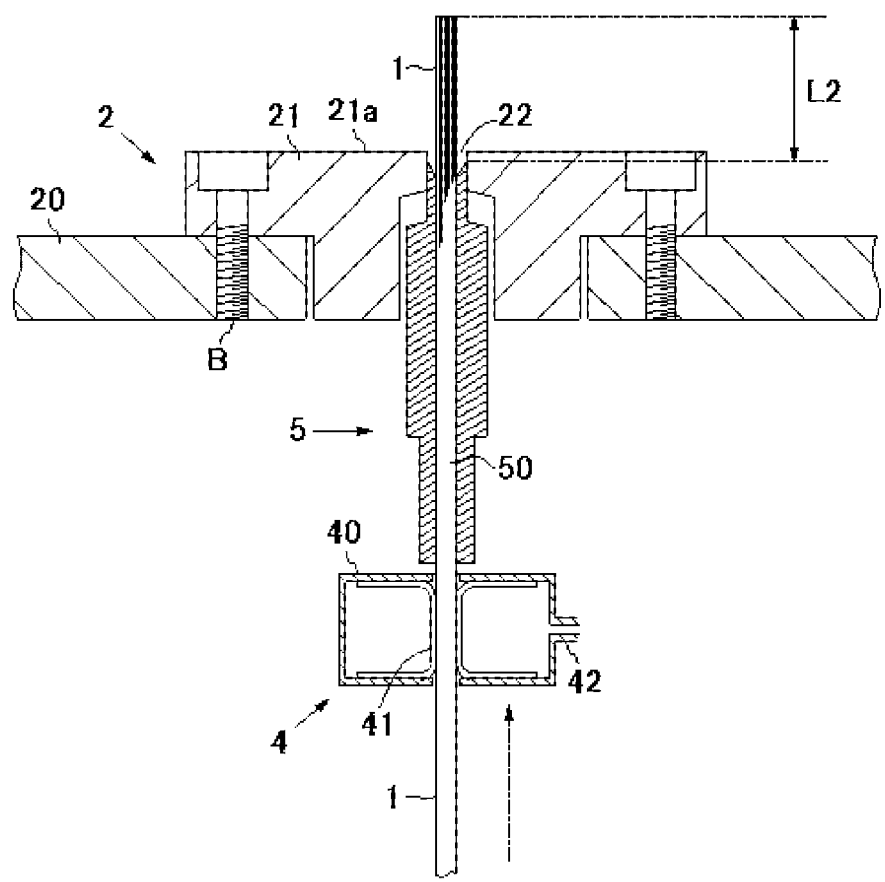
FIG. 4 is a cross-sectional view illustrating a part of the step (i).
Figure 5:
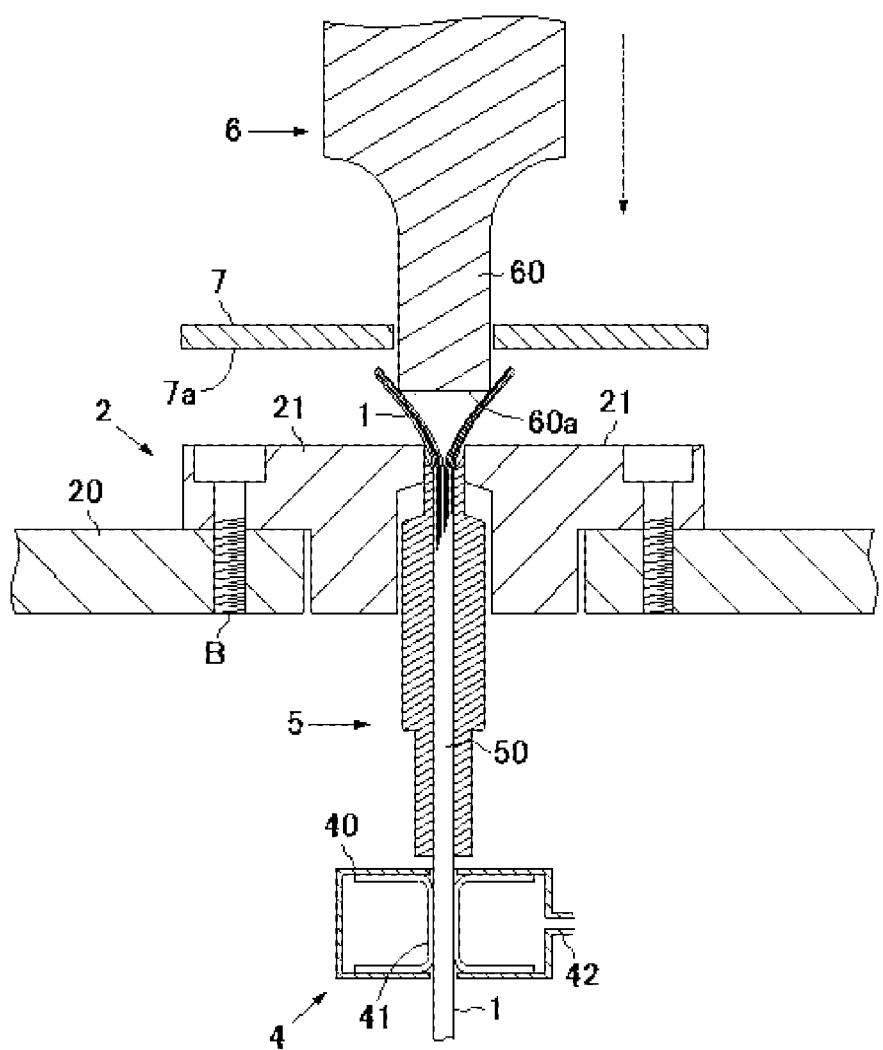
FIG. 5 is a cross-sectional view illustrating a part of the step (ii).
Figure 6:
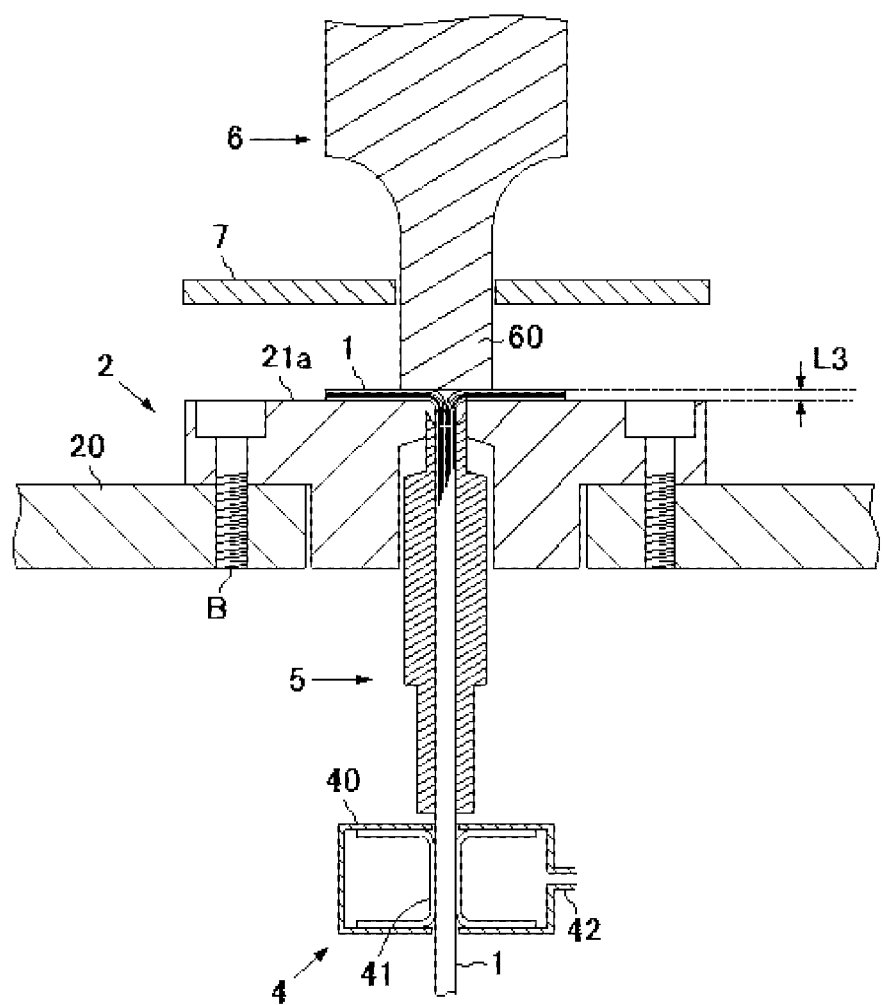
FIG. 6 is a cross-sectional view illustrating a part of the step (ii).
Figure 7:
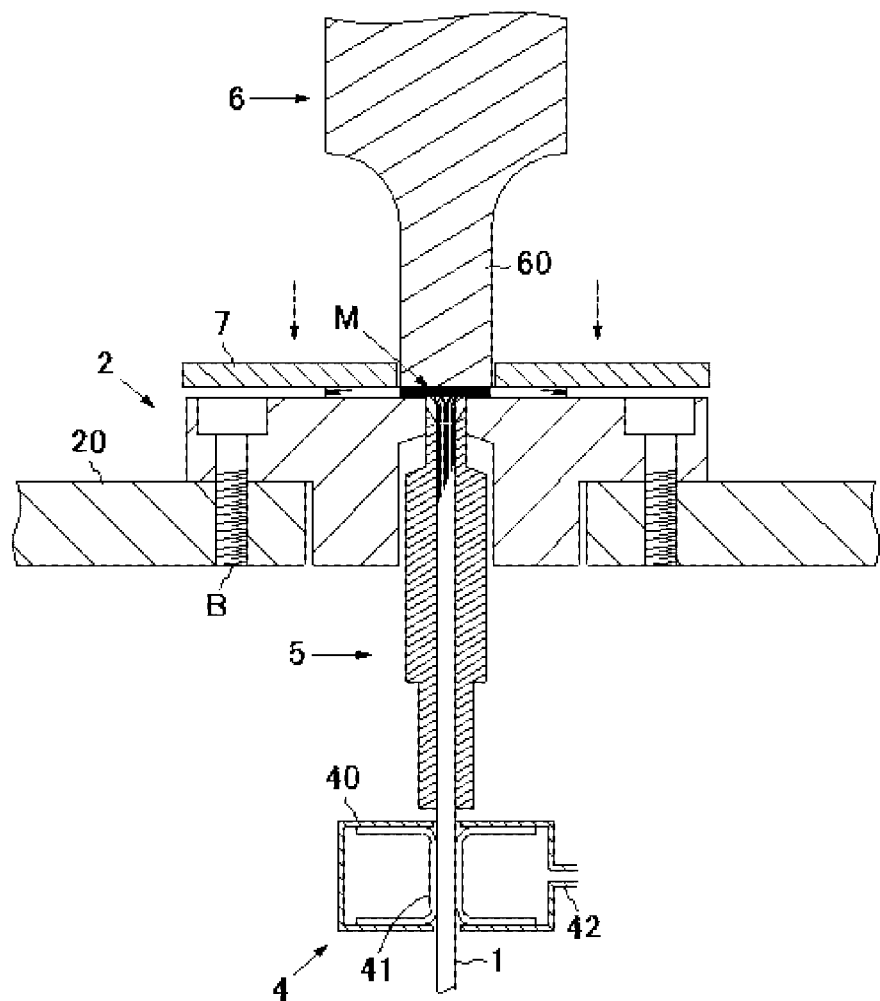
FIG. 7 is a cross-sectional view illustrating a part of the step (iii).
Figure 8:
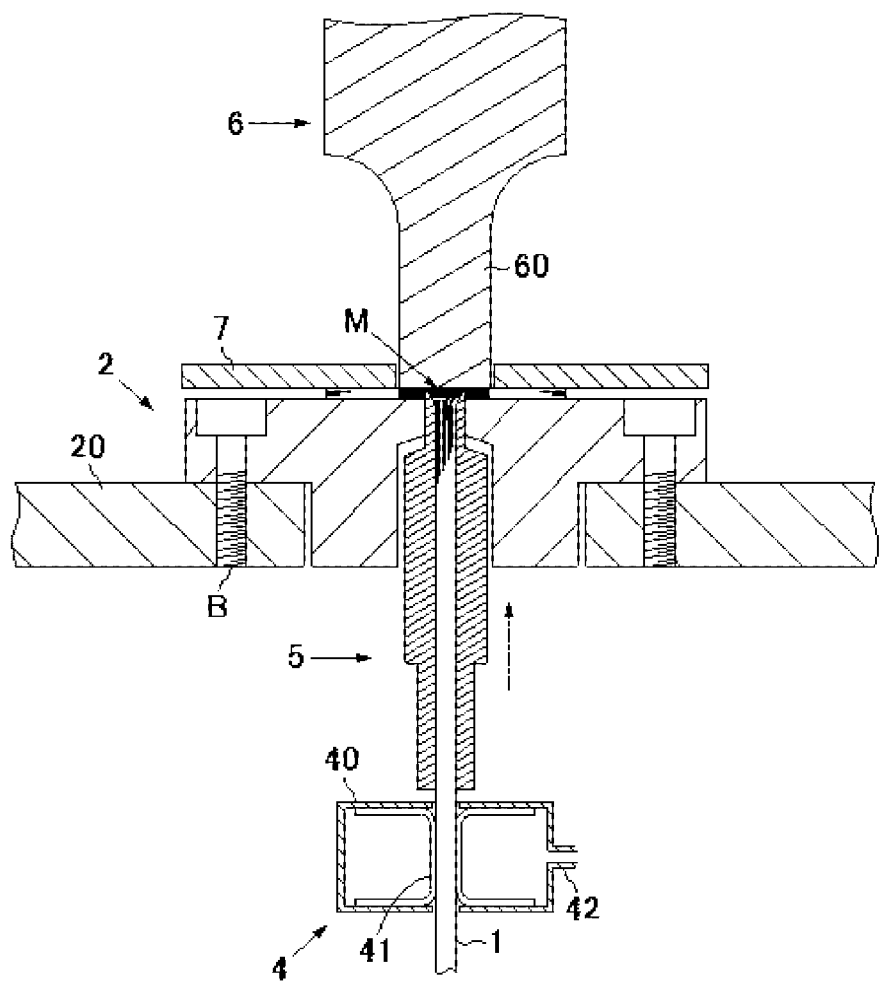
FIG. 8 is a cross-sectional view illustrating a part of the step (iv).
Figure 9:
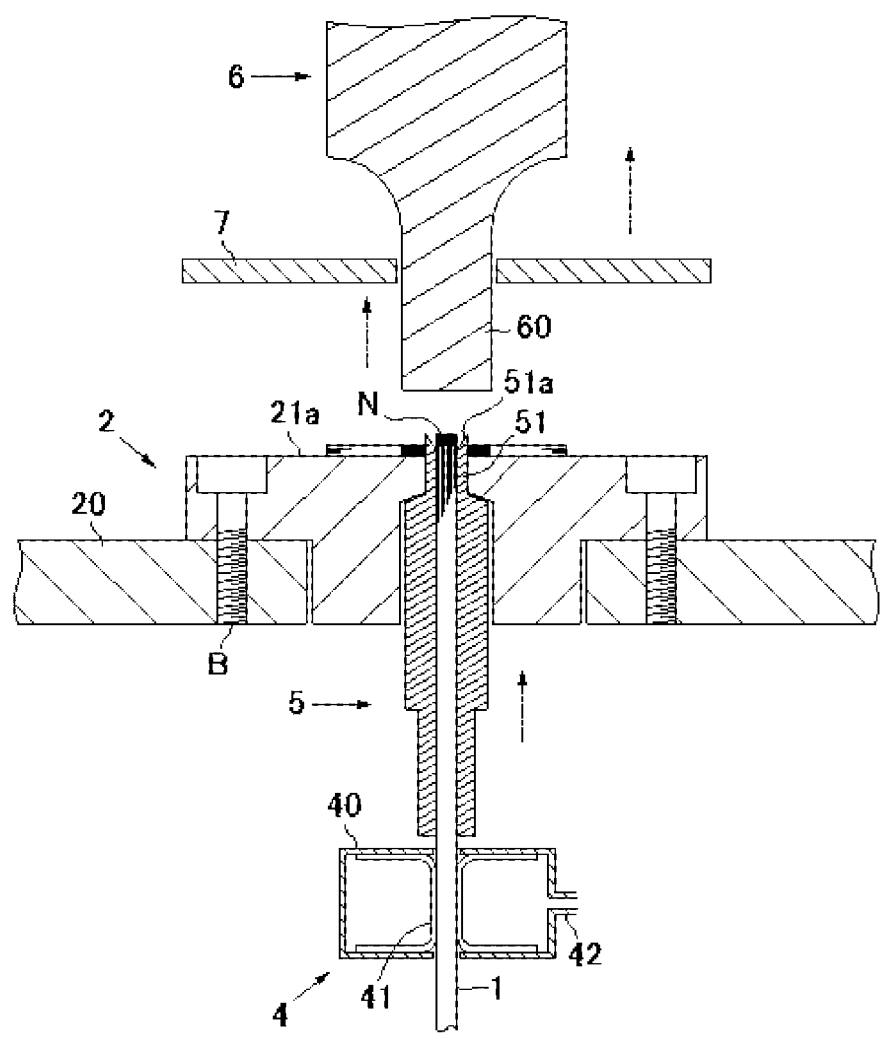
FIG. 9 is a cross-sectional view illustrating a part of the step (iv).
Figure 10:
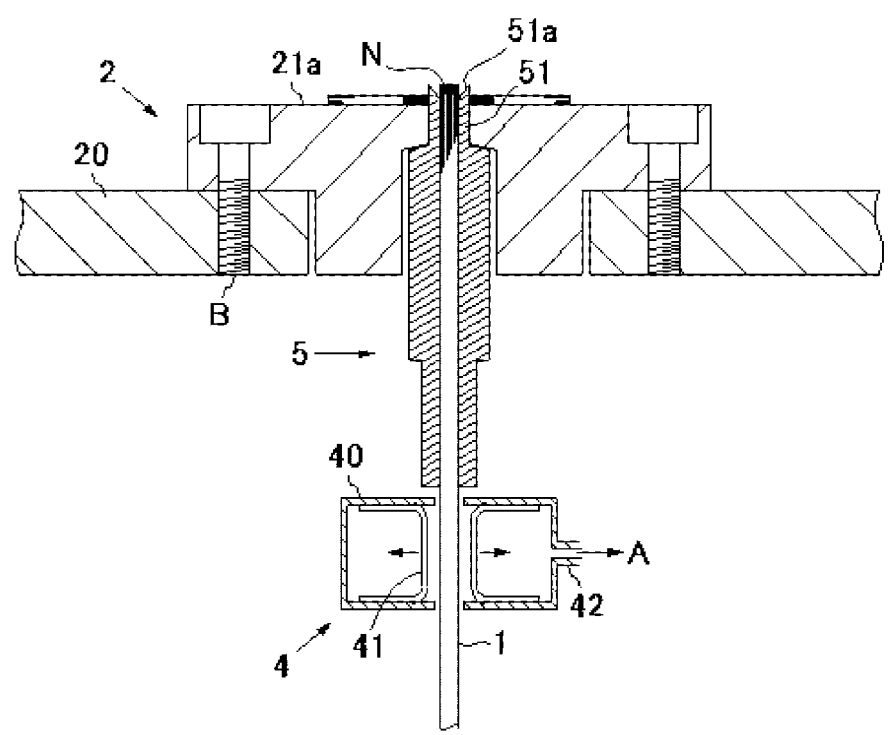
FIG. 10 is a cross-sectional view illustrating a part of the step (iv).
Figure 11:
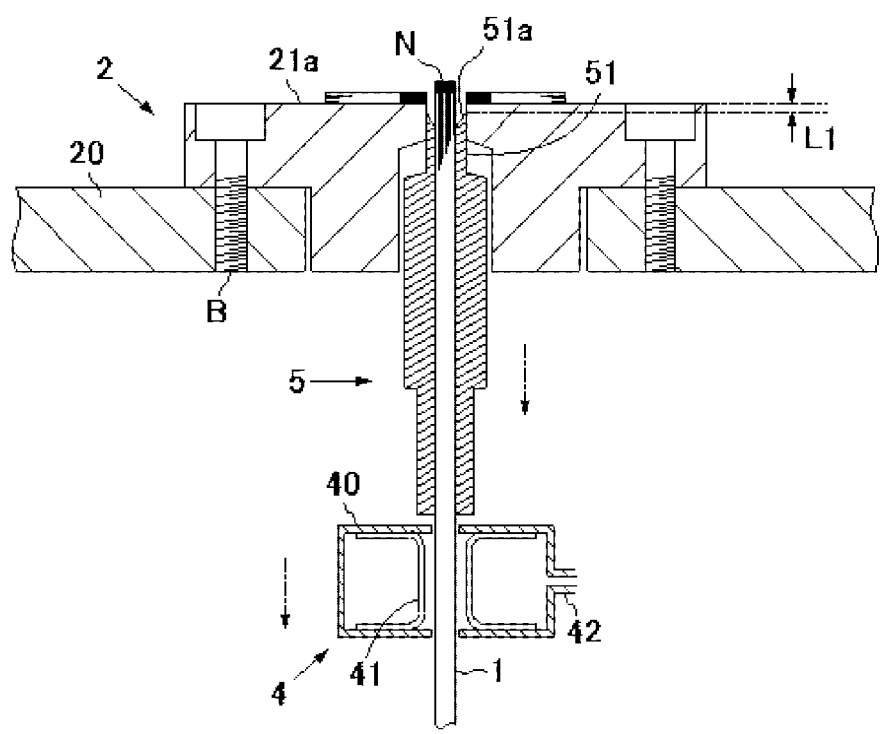
FIG. 11 is a cross-sectional view illustrating a part of the step (iv).
Figure 12:
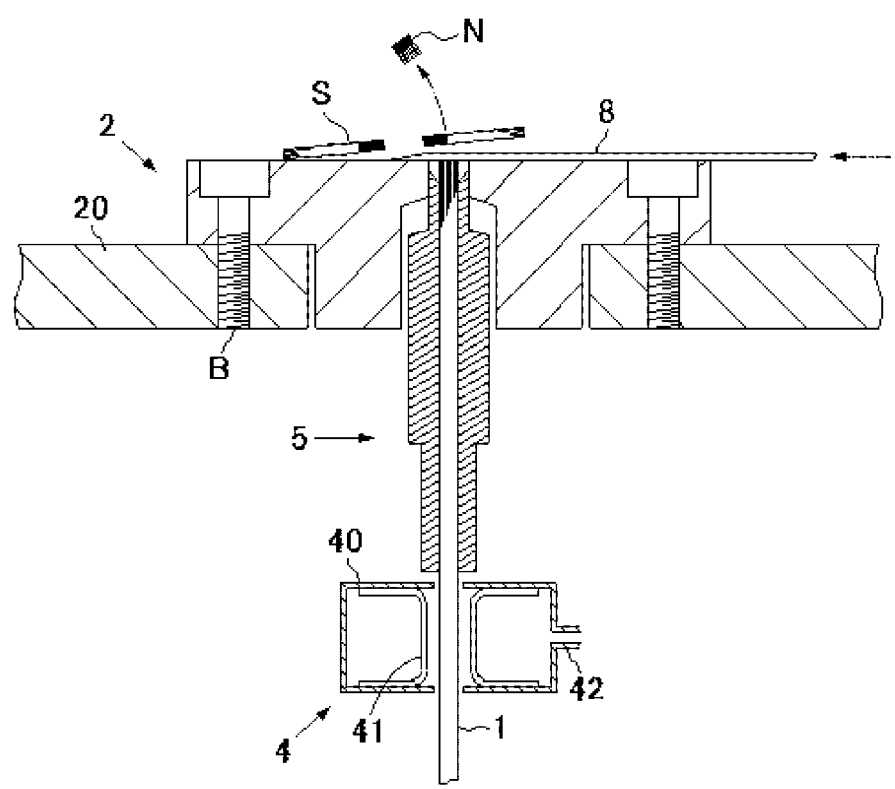
FIG. 12 is a cross-sectional view illustrating a part of the step (iv).
Figure 13:
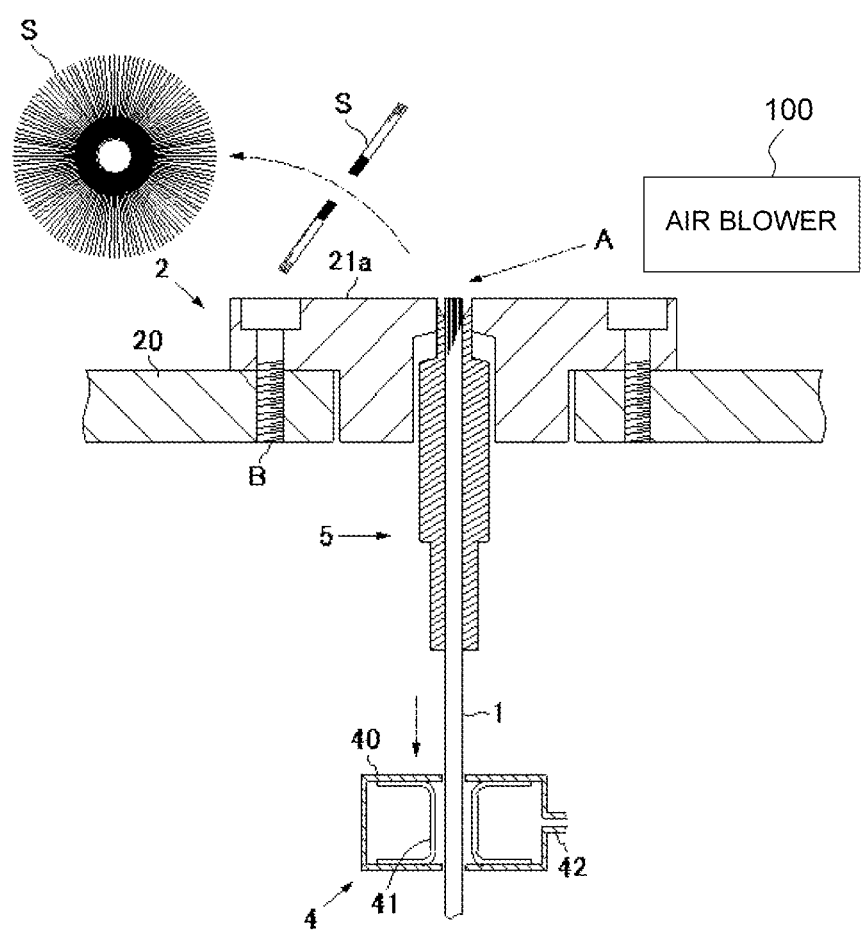
FIG. 13 is a cross-sectional view illustrating a part of the step (iv).

A air
B bolt
L1 to L3 distance between constituents
M core
N welding remains
S individual brush unit
1 filament group
2 anvil unit
20 frame
21 anvil
21a anvil top surface
22 insertion hole
23 hollow space
3 filament feeding unit
4 chuck
40 casing
41 elastic member
42 supply and exhaust hole
43 compressor
5 feeder
50 shaft tube
51 feeding hole
51a ring cutter
6 ultrasonic welder
60 horn
60a horn end surface
61 oscillator
7 pressing member
70 through hole
7a pressing member bottom surface
8 sliding blade

The invention claimed is:

1. A method for manufacturing an individual brush unit that constitutes a rotary brush by being stacked in multiple layers, the method comprising the steps of:
 (i) feeding a filament group from a feeder of a filament feeding unit, and holding the filament group while a predetermined amount of the filament group protrudes outward from an insertion hole of an anvil, the filament group being a collection of multiple filaments in a bundle;
 (ii) pushing and radially expanding a protruding tip of the filament group by a horn tip portion of an ultrasonic welder;
 (iii) welding a central part of the expanded filament group by the horn tip portion, to form the individual brush unit; and
 (iv) sandwiching the welded central part between a ring cutter provided on a tip of the feeder and the horn tip portion, and cutting out a core of the welded central part using the ring cutter, to simultaneously form a shaft hole and separate the individual brush unit from the filament group, wherein
 the step (iv) includes cutting out the core of the welded central part after the horn stops welding the filament group.

2. The method for manufacturing an individual brush unit according to claim 1, wherein the step (iv) includes cutting out the core of the welded central part after the welded central part cools down.

3. A apparatus for manufacturing an individual brush unit that constitutes a rotary brush by being stacked in multiple layers, the apparatus comprising:
 an anvil having an insertion hole through which a filament group passes, the filament group being a collection of multiple filaments in a bundle;
 a filament feeding unit which includes a feeder including a ring cutter for cutting the filament group provided on a tip of the feeder, the filament feeding unit feeding the filament group from the feeder and holding the filament group while a predetermined amount of the filament group protrudes outward from the insertion hole of the anvil; and
 an ultrasonic welder including a horn having a horn tip portion, the horn pushing and radially expanding a protruding tip of the filament group, and welding a central part of the expanded filament group, to form the individual brush unit, wherein
 a core of the welded central part is sandwiched between the ring cutter and the horn tip portion and is cut out, to simultaneously form a shaft hole and separate the individual brush unit from the filament group, and
 the core of the welded central part is sandwiched between the ring cutter and the horn tip portion and is cut out, after the core of the welded central part cools down.

4. A apparatus for manufacturing an individual brush unit that constitutes a rotary brush by being stacked in multiple layers, the apparatus comprising:
 an anvil having an insertion hole through which a filament group passes, the filament group being a collection of multiple filaments in a bundle;
 a filament feeding unit which includes a feeder including a ring cutter for cutting the filament group provided on a tip of the feeder, the filament feeding unit feeding the filament group from the feeder and holding the filament group while a predetermined amount of the filament group protrudes outward from the insertion hole of the anvil; and
 an ultrasonic welder including a horn having a horn tip portion, the horn pushing and radially expanding a protruding tip of the filament group, and welding a central part of the expanded filament group, to form the individual brush unit, wherein
 a core of the welded central part is sandwiched between the ring cutter and the horn tip portion and is cut out, to simultaneously form a shaft hole and separate the individual brush unit from the filament group, and the core of the welded central part is sandwiched between the ring cutter and the horn tip portion and is cut out, after the horn stops welding the filament group.

5. The apparatus for manufacturing an individual brush unit according to claim 4, further comprising a sliding blade which is provided on a top surface of the anvil and cuts off and removes welding remains of the filament group cut using the ring cutter and the horn tip portion.

6. The apparatus for manufacturing an individual brush unit according to claim 5, further comprising an air blower for removing, from the anvil, the individual brush unit separated from the filament group, by air pressure.

7. The apparatus for manufacturing an individual brush unit according to claim 4, further comprising an air blower for removing, from the anvil, the individual brush unit separated from the filament group, by air pressure.

* * * * *